United States Patent [19]

Sheets

[11] 4,068,535
[45] Jan. 17, 1978

[54] METHOD AND APPARATUS FOR CONTROLLING THE TENSION OF DRIVE BELTS

[75] Inventor: Kerney T. Sheets, Duplessis, La.
[73] Assignee: David L. Ray, Baton Rouge, La.
[21] Appl. No.: 630,195
[22] Filed: Nov. 10, 1975
[51] Int. Cl.² .......................... F16H 7/12; F16H 7/10
[52] U.S. Cl. ...................... 74/242.11 A; 74/242.14 R
[58] Field of Search ............ 74/242.14 R, 242.11 L, 74/242.11 W, 242.11 A, 242.1 A, 242.8

[56] References Cited

U.S. PATENT DOCUMENTS

| | | | |
|---|---|---|---|
| 716,520 | 12/1902 | Cole | 74/242.1 |
| 2,897,683 | 8/1959 | Carver | 74/242.1 |
| 3,574,287 | 4/1971 | Heidacker | 74/242.1 |
| 3,575,058 | 4/1971 | Kraus | 74/227 |
| 3,602,054 | 8/1971 | Monteigh et al. | 74/242.9 |
| 3,603,096 | 12/1971 | Brewer | 74/242.1 A |
| 3,926,063 | 12/1975 | Mayfield | 74/242.11 A |

Primary Examiner—Leonard H. Gerin
Attorney, Agent, or Firm—David L. Ray

[57] ABSTRACT

A method and apparatus for controlling the tension of flexible drive belts, or a single drive belt, connecting a drive pulley to a driven pulley. The apparatus includes a first idler assembly for engaging the slack run of the drive belts, a second idler assembly for engaging the drive run of the drive belts, and a tension member for adjusting the distance between the first idler assembly and the second idler assembly to a distance sufficient to cause the apparatus to maintain a position between the drive pulley and the driven pulley. The apparatus requires no external support or positioning member to maintain the position of the apparatus on the belts while the apparatus is controlling the tension of the moving belts. The method includes placing a first idler assembly on the slack run of the drive belts, placing a second idler assembly on the drive run of the drive belts, and forcing the assemblies together to increase the tension of the drive belts.

16 Claims, 10 Drawing Figures

METHOD AND APPARATUS FOR CONTROLLING THE TENSION OF DRIVE BELTS

BACKGROUND OF THE INVENTION

The present invention relates to the transmission of mechanical power, especially to transmission systems of the flexible belt type, including both single belt and multiple belt transmission systems. More particularly the invention relates to an apparatus for controlling the tension of such belts.

Flexible drive belts are widely used for transmitting power from large engines to machinery being driven by such engines. When a belt stretches sufficiently, the belt begins to slip and full power is not transmitted from the driving pulley to the driven pulley. As the belt begins to slip, friction causes the temperature of the belt to increase, and the rate of deterioration increases rapidly after slipping begins.

Both single drive belts and multiple drive belts have similar slipping problems. In a single drive belt application, as the belt begins to slip, increased tension must be placed on the belt by means of an idler pulley connected to some fixed structure such as the driving engine, for example, or by increasing the distance of the drive pulley from the driven pulley. If such steps are not taken the belt must be removed and replaced with a new belt.

It is well known that for many purposes multiple belt drive offers a large number of advantages as compared to single belt drives, especially in large power installations for which the advantages are so well understood to require no discussion here. With the introduction of multiple belt transmission of power there appeared a problem which did not exist with a single belt type of transmission, namely that of keeping all the belts under equal tension. This problem obviously increases with the number of belts because it is extremely difficult to secure several belts of the same length which will maintain the same length throughout their life. It is apparent that if the belts differ in length they will not carry equal fractions of power transmitted with the result that some of them will be overloaded and will wear out prematurely. Another disadvantage from the unequal loading of the belts is that the sheaves or pulleys of the prime mover or driving apparatus and of the driven apparatus will be subjected to uneven strains which may injure the shafts and the bearings. Furthermore, the whipping of the partially loaded belts causes vibration and excessive wear both on the belt, and the bearings as well, resulting in inefficient power transmission. It will therefore be apparent that in large installations where multiple belts are used, in which case shut-downs are very expensive, it is especially important that as many as possible of these and other attendant disadvantages be avoided.

Such shut-downs are expensive for several reasons. In multiple belt transmission of power, when one of the belts start to slip sufficiently to cause a power loss, it is commonly necessary to change every belt in the system rather than just the loose belt. All the belts are changed because the belts not slipping have stretched to some extent due to previous wear, and a new belt would not be the same length as the older belts. Thus, the cost of the belts themselves is a great expense. In addition, the increased time for changing multiple belts increases expenses due to loss of the use of the driven equipment.

Belt tensioning devices are known in the art for both single and multiple power transmission. U.S. Pat. Nos. 3,837,291; 3,391,807; 2,499,287; 2,213,992; 2,726,364; and 2,066,721 disclose various single and multiple belt tensioning devices.

However, the devices of the prior art require that the tensioning apparatus be attached to some structure adjacent to or connected to the prime mover or the driven apparatus to position the tensioning apparatus properly over the appropriate belt or belts. Such attachment results in significant disadvantages. It is difficult to place a safety guard over an arm or member attaching an idler pulley and over the belts. Furthermore, the structure necessary to stationarily position the belt tensioning apparatus over the belts can be bulky and expensive to manufacture.

SUMMARY OF THE INVENTION

In accordance with the present invention there is provided a method and apparatus for controlling the tension of flexible drive belts, or a single drive belt, connecting a drive pulley to a driven pulley. The apparatus includes a first idler assembly for engaging the slack run of the drive belts, a second idler assembly for engaging the drive run of the drive belts, and a tension member for adjusting the distance between the first idler assembly and the second idler assembly to a distance sufficient to cause the apparatus to maintain a position between the drive pulley and the driven pulley. The apparatus requires no external support or positioning member to maintain the position of the apparatus on the belts while the apparatus is controlling the tension of the moving belts. The method includes placing a first idler assembly on the slack run of the drive belts, placing a second idler assembly on the drive run of the drive belts, and forcing the assemblies together to increase the tension of the drive belts.

DESCRIPTION OF THE PREFERRED EMBODIMENTS

Figure 1:
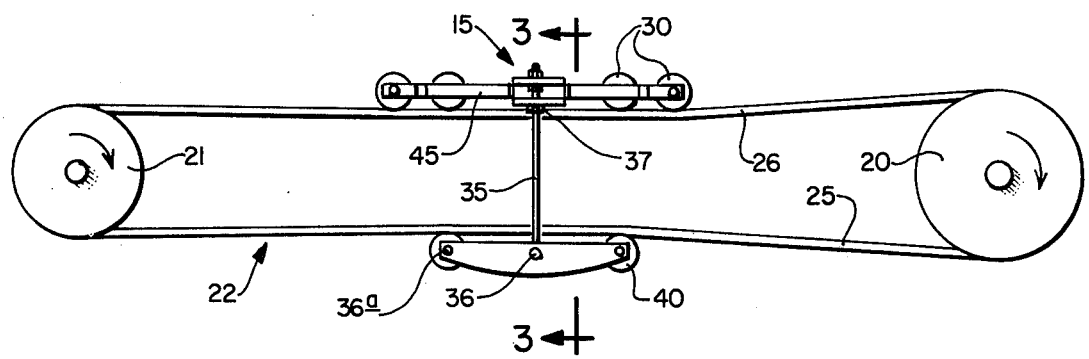
FIG. 1 is a side plan view of the tensioning apparatus of the present invention mounted on V-belts extending over a drive and a driven pulley.

Referring now to the drawings, in FIG. 1 is shown the tensioning apparatus of the present invention generally indicated by the numeral 15 disposed on the outside of the belts generally indicated by the numeral 22. The belts are wrapped around drive pulley 21 and driven pulley 20, which turn in the direction indicated by the arrows of the pulleys. The term "pulley" as used herein includes a pulley with a single groove or sheave, and a pulley with multiple grooves or sheaves. Drive pulley 21 is connected to a prime mover such as a diesel engine or electric motor (not shown), and driven pulley 20 is connected to a drive mechanism such as a pump or the like (not shown).

Assuming the drive to be in the direction shown by the arrows associated with the pulleys 20 and 21 in FIG. 1, the lower running side 25 of the belts is the tight side, hereinafter called the "drive run", and the upper side 26 of the belt is the slack side, hereinafter called the "slack run". By the expressions "drive" and "slack" is meant the side of the belt which moves toward the drive pulley and the side of the belt which moves away from the drive pulley, respectively.

Figure 3:
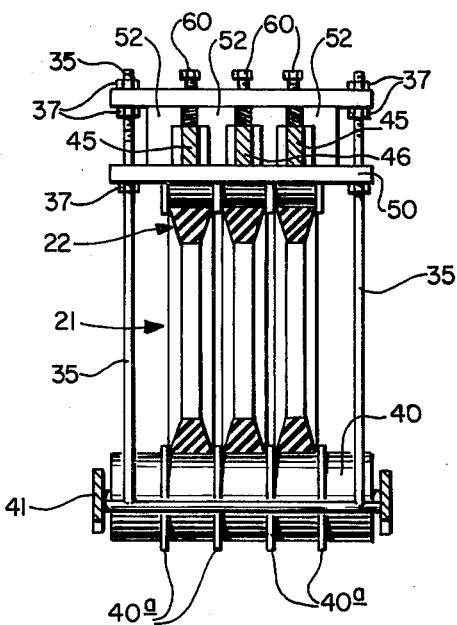
FIG. 3 is a partly sectional view taken along lines 3—3 of FIG. 1.

The drive belts 22 are shown in cross-section in FIG. 3 to be conventional V-belts which are well known in the art. The belt tensioning apparatus of the present invention will work well with other types of belt drives such as a single belt which has two or more V-shaped pulley engaging portions which are adapted to closely engage correspondingly shaped grooves in the drive and driven pulley. When such belts are used, the idler pulleys would be made wide enough to receive the full width of the flat side or outside of the belt. Furthermore, flexible belts having circular, elliptical, square, or rectangular cross-sections could be employed with the apparatus of the present invention.

Figure 2:
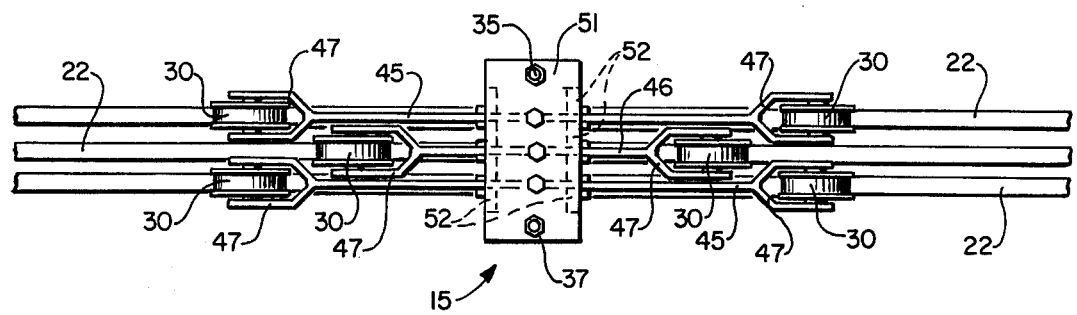
FIG. 2 is a top plan view of the tensioning apparatus of the present invention disposed over three V-belts.
Figure 6:
FIG. 6 is an end, plan view of a pulley.
Figure 7:
FIG. 7 is an end, plan view of a pulley.
Figure 8:
FIG. 8 is an end, plan view of a pulley.
Figure 9:
FIG. 9 is an end, plan view of a pulley.
Figure 10:
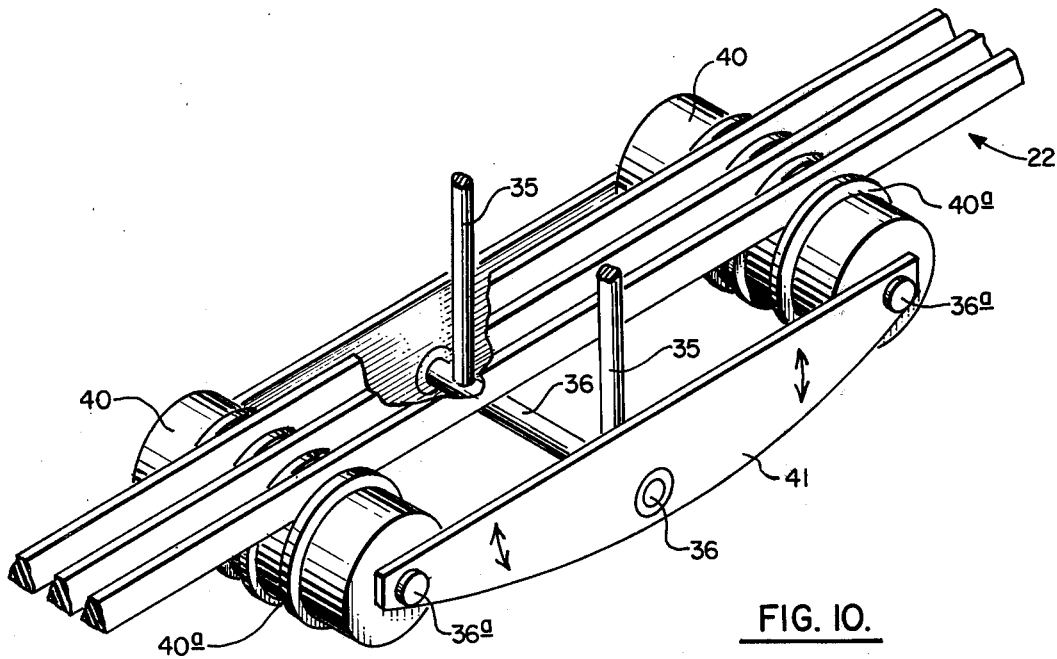
FIG. 10 is a cutaway perspective view of the lower idler pulley.

The belt tensioning apparatus 15 can be seen in FIGS. 1 and 2 to include a series of pulleys 30, rotatably connected to a series of long idler arms 45 and short idler arms 46 having forks 47 at their ends. The pulleys 30 turn on axles connected to the forks. The pulleys 30 shown in FIGS. 1-3 are shown enlarged in FIG. 8. In addition, pulleys 30a, 30b, and 30c, having the configuration shown in FIGS. 6, 7 and 9 could be used in place of pulley 30.

Figure 4:
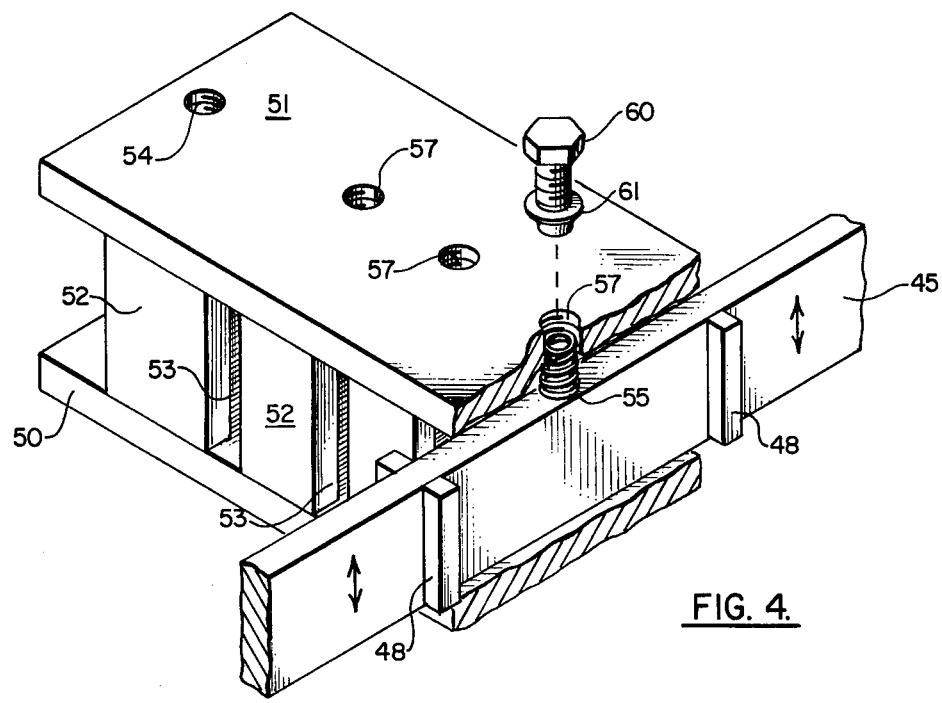
FIG. 4 is a partly sectional view of a portion of the interior of the tensioning apparatus showing a coil spring embodiment.

Idler arms 45 and 46 are held between base plate 50 and top plate 51, as can be seen in FIG. 3. Arms 45 and 46 are held apart from each other by two rows of spacers 52, as can be seen in FIGS. 1 and 4. Spacers 52 are vertical members rigidly affixed to bottom plate 50 to define slots 53 therebetween for receipt of idler arms 45 and 46. Slots 53 prevent idler arms 45 and 46 and the pulleys 30 mounted on the ends thereof from contacting the adjacent idler arms and pulleys, while allowing the individual arms 45 and 46 to be moved vertically upward or downward to vary the tension on individual belts. Idler arms 45 preferably have guides 48 connected thereto to prevent lateral motion of the idler arms, i.e., to prevent them from moving relative to each other in the direction of the belt.

Top plate 51 has holes 54 therein for receipt of tension members 35—35 as does bottom plate 50. Tension members 35—35 are preferably threaded rigid rods having nuts 36 threaded thereon. The threads should extend from the upper end to well below base plate 50. However, a flexible member could be used such as steel cable or fiber rope. Top plate 51 preferably is not rigidly connected to spacers 52. Top plate 51 is held in position by tension members 35—35 and nuts 37 connected thereto. Top plate 51 has a series of threaded holes 57 therein for receipt of bolts 60.

Tension members 35—35 have an axle 36 connected thereto. Mounted on axle 36 are rocker arms 41—41. Rocker arms 41—41 pivot or rock about axle 36. Idler pulleys 40—40 are connected to rocker arms 41—41 by means of axles 36a—36a about which idler pulleys 40—40 rotate. The belts 22 are separated by a series of ridges 40a on idler pulleys 40—40. If desired, ridges 40a could be eliminated and pulley 40 could be a cylinder with a smooth surface, but ridges 40a are preferred. Each of the idler pulleys 40—40 can be a single, one-piece pulley with a series of sheaves thereon as shown in the drawings, or pulleys 40—40 can be formed by placing a series of single pulleys on axles 36a—36a.

Figure 5:
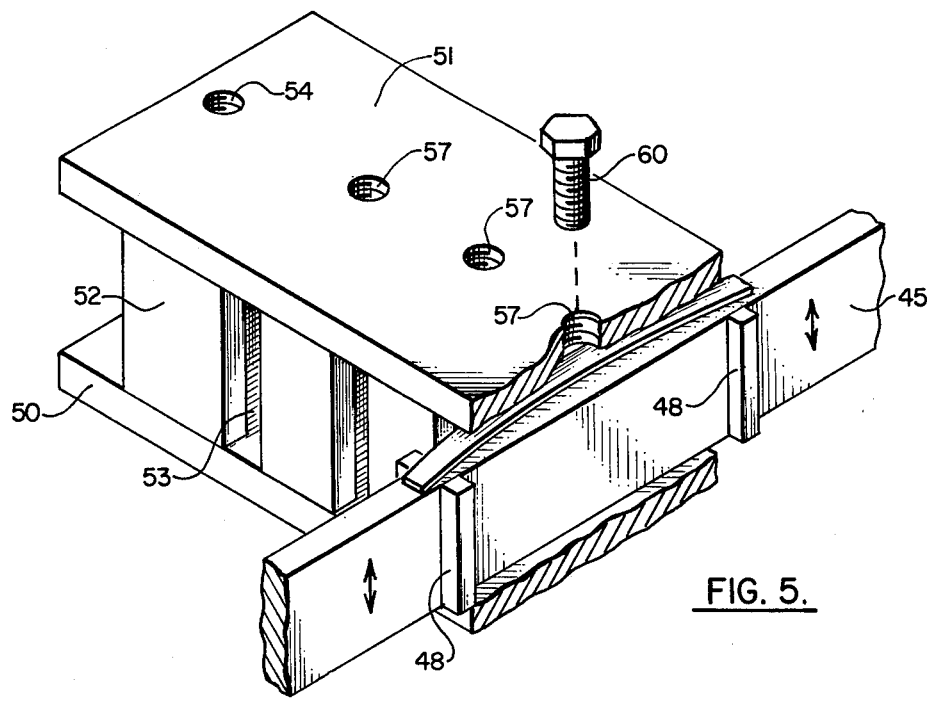
FIG. 5 is a partly sectional view of a portion of the interior of the tensioning apparatus showing a leaf spring embodiment.

In the embodiment shown in FIG. 3 the bolts 60 directly contact the top of idler arms 45 and 46 to allow individual tension adjustment of each idler arm by tightening or loosening an individual bolt 60. However, springs may be used to apply force to arms 45 and 46. In FIG. 4, bolt 60 can be seen to have fitted thereover aligning ring 61 which fits beneath the bottom of top plate 51 to contact spring 55 and thereby align and compress spring 55 when bolt 60 is screwed into hole 54. Thus, instead of bolt 60 directly contacting the arms, the compressed coil spring 55 contacts the arms 45 and 46 and applies a constant downward force thereon permitting idler arms 45 and 46 to move upwardly and downwardly as a belt stretches while maintaining approximately the same downward force on the belt. In FIG. 5 coil spring 55 is replaced with a leaf spring 56. The leaf spring 56 acts in the same manner as coil spring 55.

The spring therefore automatically maintains a desired tension in an individual belt by forcing the idler arm down over a belt as the belt stretches. Such automatic adjustment eliminates the need for manual adjustment of the various bolts 60 as a belt stretches.

While only three idler arms are shown in the drawings, more can be added, depending upon the number of belts on the drive and driven pulley. For example, if there were four belts on the drive and driven pulley, an additional sheave or pulley would be added to idler pulleys 40—40, and an additional short idler arm 46 would be placed alongside arm 45. Plates 50 and 51 would have to be slightly lengthened, as would axles 36 and 36a. If five belts were placed on the drive and driven pulleys 20 and 21, an additional long arm 45 would be placed adjacent to short idler arm 46 and an additional sheave or pulley would be added to pulleys 40—40. Similarly, if fewer than three belts were employed, an appropriate number of arms 45 and 46 and pulleys or sheaves on pulleys 40—40 would be removed. Thus, the apparatus of the present invention can be used to control the tension of belt drive systems using a single belt only, or multiple belt drive systems employing a large number of belts.

From the above description, it is apparent that the apparatus of the present invention does not need any external positioning or support member to maintain the apparatus in position between the drive and driven pulley while the pulleys are rotating at full speed or while the pulleys are not rotating. Conventional belt tensioning apparatuses need an external positioning or support member affixed to some stationary, rigid object or framework. See for example, U.S. Pat. No. 2,066,721 and U.S. Pat. No. 2,499,287, which are hereby incorporated by reference.

To maintain the apparatus of the present invention in the tensioning or running position without employing external supports or positioning members, as shown, for example, in FIG. 1, it is necessary that the distance between the top idler pulleys 30 and the bottom idler pulleys 40—40 be adjusted to a distance less than the diameter of the smaller of the driven pulley and the drive pulley. The distance between the top idler pulleys 30 and the bottom idler pulleys 40—40 is herein defined as the perpendicular distance between the outside of the portion of the drive run of the belts 22 lying between pulleys 30 and the outside of the portion of the slack run of the belts 22 lying between idler pulleys 40—40. The diameter of the driven and drive pulley is herein defined as the maximum outside diameter of the pulley, rather than the diameter as measured to the bottom of the groove of the pulley.

Thus, it can be seen that the apparatus of the present invention cannot be forced over the drive pulley or the driven pulley when the apparatus is adjusted to a position where the distance between the top idler pulleys 30 and the bottom idler pulleys 40—40 is less than the diameter of the smaller of the drive pulley 21 and the driven pulley 20. For example, in FIG. 1, the driven pulley 20 is smaller in diameter than drive pulley 21, and the distance between the top idler pulleys 30 and bottom idler pulleys 40—40 is less than the diameter of driven pulley 20.

To remove the apparatus from the drive belts, nuts 37—37 on top of plate 51 are removed and plate 51 is removed from rods 35—35. The nuts 37—37 on rods 35—35 above base plate 50 are removed. Plate 50 is then moved upward and off of rods 35—35. The holes in plate 50 are slightly larger than the diameter of rods 35—35 to permit easy removal of plate 50. Removal of plate 50 also removes idler arms 45 and 46, which rest on plate 50 between spaces 52 after plate 51 has been removed. Rods 35—35 are connected to the remaining structure on the slack run and have no support after plates 50 and 51 are removed.

To place the apparatus on a belt drive system, the above procedure is reversed. If a safety guard or screen surrounds the belts, the guard is removed. The guard may be provided with small slots or holes therein through which a wrench may be inserted to tighten or loosen bolts 60. Rods 35—35 having connected thereto rocker arms 41—41 with pulleys 40—40 thereon are positioned beneath the belts, and the rods are moved vertically upward around the belts to a point where the tops of rods 35—35 extend above the slack run of the belts and pulleys 40—40 contact the outside of the drive run of the belts. Nuts 37—37 are then threaded onto rods 35—35. Plate 50 with idler arms 45 and 46 resting thereon is then aligned with rods 35—35 are inserted therein.

Plate 50 is supported by nuts 37—37 therebeneath. Additional nuts 37—37 may then be threaded on rods 35—35. Next, plate 51 with bolts 60 connected thereto is fitted onto rods 35—35 and nuts 37—37 are threaded over plate 51. Top plate 51 is then forced downward on rods 35—35, thereby contacting spacers 52 and forcing plate 50 downward on rods 35—35, causing bolts 60 or springs 55 to contact idler arms 45 and 46. Thus, pulleys 30 on arms 45 and 46 are forced into contact with belts 22. Nuts 37—37 above plate 51 can then be tightened downward into plate 51 to decrease the distance between upper pulleys 30 and lower pulleys 40—40 to a distance less than the diameter of the smaller of the drive pulley and the driven pulley. Once such an adjustment is made, nuts 37—37 beneath plate 50 may be tightened upward against the bottom of plate 50 to rigidly fix the position of plates 50 and 51 on rods 35—35.

Individual adjustment of the position of idler arms 45 and 46 in slots 53 can be adjusted by tightening or loosening bolts 60. If springs are used, the springs apply a downward force on the idler arms 45 and 46 at any vertical position in slots 53 to automatically adjust the position of idler 45 and 46.

The various components of the apparatus of the invention can be made from metals such as iron, steel, aluminum, and the like. The components could also be made from high-strength plastics such as glass fiber reinforced thermoplastics, for example. Numerous other high strength plastics could be used. If the apparatus were made of plastics, preferably, metal ball or roller bearings would be inserted into the pulleys.

While the preferred embodiment has been shown in the drawings, it will be understood that many changes could be made in the above construction and many apparently widely different embodiment of this invention could be made without departing from the scope thereof. For example, instead of using two pulleys 40—40 connected to rocker 41, rocker 41 could be removed, and a single pulley 40 could be rotatably mounted on an axle similar to axle 36. Also, instead of mounting two pulleys 30—30 on an idler arm such as idler arms 45 and 46, the arms could be eliminated and a single pulley could be utilized by modifying the plate structure which holds the idler arms. It is intended that all matter contained in the drawings and specification shall be interpreted as illustrative and not in a limiting sense.

I claim:

1. A floating apparatus for controlling the tension of a flexible drive belt connecting a drive pulley to a driven pulley, said apparatus being supportable solely by said drive belt, said floating apparatus comprising:
   a. first rotatable means for frictionally engaging the slack run of said drive belt, said first means being disposed on the outside of said drive belt,
   b. second rotatable means for frictionally engaging the drive run of said drive belt, said second rotatable means being disposed on the outside of said drive belt, said second rotatable means having an axis of rotation parallel to the axis of rotation of said first rotatable means,
   c. means for connecting said first rotatable means to said second rotatable means,
   d. adjustable tension imposing means connected to said first rotatable means for urging said drive run of said drive belt and said slack run of said drive belt toward each other to maintain the tension in said drive belt sufficiently to prevent substantial slippage of said drive belt about said drive pulley and said driven pulley.

2. The floating apparatus of claim 1 wherein said first rotatable means comprises first idler pulley means adapted to ride on the slack run of said drive belt.

3. The floating apparatus of claim 2 wherein said adjustable tension imposing means comprises spring means connected to said first idler pulley means to urge said first idler pulley means toward said second rotatable means.

4. The apparatus of claim 3 wherein said spring means is a leaf spring.

5. The apparatus of claim 3 wherein said spring means is a coil spring.

6. The apparatus of claim 3 wherein said adjustable tension imposing means comprises threaded bolt means connected to said idler pulley means to urge said idler pulley means toward said second rotatable means.

7. The floating apparatus of claim 2 wherein said first idler pulley means comprises a two ended idler arm, said idler arm having at least one idler pulley connected to each end thereof, each of said idler pulleys being adapted to ride on the slack run of said belt.

8. The floating apparatus of claim 1 wherein said second rotatable means comprises second idler pulley means, said second idler pulley means being adapted to ride on the drive run of said belt.

9. The floating apparatus of claim 1 wherein said second rotatable means comprises one idler pulley adapted to ride on said drive run of said drive belt.

10. The floating apparatus of claim 1 wherein said second rotatable means comprises two idler pulleys adapted to ride on said drive run of said drive belt.

11. The floating apparatus of claim 1 wherein said means for connecting said first rotatable means to said second rotatable means comprises rod means.

12. A floating apparatus for controlling the tension of flexible drive belts connecting a drive pulley to a driven pulley, said drive pulley and said driven pulley having a series of sheaves thereon for receipt of said belts, said floating apparatus being supportable solely by said belts, comprising:
   a. first rotatable means for frictionally engaging the slack run of said drive belts including a series of first idler pulley means equal in number to the number of said drive belts connecting said drive pulley to said driven pulley, said first idler pulley means being adapted to ride on the outside of the slack run of said drive belts,
   b. second rotatable means for frictionally engaging the drive run of said drive belts including a second idler pulley means, said second idler pulley means being adapted to ride on the outside of the drive run on said drive belts, said second idler pulley means having an axis of rotation parallel to the axes of rotation of said first idler pulley means,
   c. means for connecting said first rotatable means to said second rotatable means,
   d. adjustable tension imposing means connected to said first rotatable means for urging said drive run of said drive belts and said slack run of said drive belts toward each other to maintain the tension in said belts sufficiently to prevent substantial slippage of said drive belts about said drive pulley and said driven pulley.

13. The floating apparatus of claim 12 wherein said adjustable tension imposing means comprises a series of spring means connected to said series of first idler pulley means to individually urge each of said series of first idler pulley means toward said second idler pulley means.

14. The apparatus of claim 13 wherein said spring means is a leaf spring.

15. The apparatus of claim 13 wherein said spring means is a coil spring.

16. The floating apparatus of claim 12 wherein said means for connecting said first rotatable means to said second rotatable means comprises rod means.

* * * * *